United States Patent
Hewitt

(10) Patent No.: US 6,802,179 B2
(45) Date of Patent: Oct. 12, 2004

(54) NOZZLE WITH SPIRAL INTERNAL COOLING CHANNELS

(75) Inventor: Ross A. Hewitt, Sacramento, CA (US)

(73) Assignee: Aerojet-General Corporation, Sacramento, CA (US)

( * ) Notice: Subject to any disclaimer, the term of this patent is extended or adjusted under 35 U.S.C. 154(b) by 0 days.

(21) Appl. No.: 10/308,645

(22) Filed: Dec. 2, 2002

(65) Prior Publication Data

US 2004/0168428 A1 Sep. 2, 2004

(51) Int. Cl.[7] .............................. F62K 1/00; F62K 9/97
(52) U.S. Cl. .................. 60/266; 60/267; 239/127.1; 239/127.3
(58) Field of Search ................ 60/266, 267; 239/127.1, 239/127.3; 29/890.01

(56) References Cited

U.S. PATENT DOCUMENTS

| | | | | |
|---|---|---|---|---|
| 2,880,577 A | * | 4/1959 | Halford et al. ............... | 60/260 |
| 2,900,168 A | * | 8/1959 | Nyborg ........................ | 60/260 |
| 2,935,841 A | * | 5/1960 | Myers et al. ................. | 60/266 |
| 2,951,336 A | * | 9/1960 | Mueller ....................... | 60/260 |
| 3,170,286 A | * | 2/1965 | Stein ........................... | 60/267 |
| 3,267,664 A | * | 8/1966 | Jones et al. .................. | 60/267 |
| 3,595,025 A | | 7/1971 | Stockel et al. | |
| 3,871,173 A | | 3/1975 | McKenna | |
| 3,962,865 A | * | 6/1976 | McCone, Jr. ................ | 60/255 |
| 4,055,044 A | * | 10/1977 | Dederra et al. .............. | 60/267 |
| 4,369,920 A | | 1/1983 | Schmidt | |
| 4,583,362 A | | 4/1986 | Wagner | |
| 4,703,620 A | | 11/1987 | Niino et al. | |
| 4,765,134 A | | 8/1988 | Brown et al. | |
| 5,221,045 A | * | 6/1993 | McAninch et al. ........... | 60/267 |
| 5,353,598 A | | 10/1994 | Huck et al. | |
| 5,387,398 A | | 2/1995 | Mueggenburg et al. | |
| 5,410,874 A | | 5/1995 | Limerick | |
| 5,670,758 A | | 9/1997 | Borchers et al. | |
| 5,804,066 A | | 9/1998 | Mueggenburg et al. | |
| 5,832,719 A | | 11/1998 | Riccardi | |
| 6,116,020 A | | 9/2000 | Cornelius et al. | |
| 6,244,041 B1 | | 6/2001 | Vasin et al. | |
| 6,442,931 B1 | | 9/2002 | Vasin et al. | |
| 6,467,253 B1 | * | 10/2002 | Haggander ................... | 60/267 |
| 6,470,671 B1 | * | 10/2002 | Kretschmer .................. | 60/267 |
| 6,582,542 B1 | * | 6/2003 | Russell et al. .............. | 156/156 |
| 2002/0104928 A1 | | 8/2002 | Schoonmaker et al. | |

OTHER PUBLICATIONS

Burkhardt, W.M. et al. "Formed platelet liner concept for regenerative cooled chambers," *AIAA 26th Joint Propulsion Conference* Jul. 16–18, 1990/Orlando, FL, pp. 1–5.

Bzibziak, R. "Miniature cold gas thrusters," *AIAA 28th Joint Propulsion Conference and Exhibit* Jul. 6–8, 1992/Nashville, TN, 7 pages total.

(List continued on next page.)

*Primary Examiner*—Ted Kim
(74) *Attorney, Agent, or Firm*—M. Henry Heines; Townsend and Townsend and Crew, LLP

(57) ABSTRACT

A convergent-divergent rocket nozzle is formed by joining two coaxially aligned conical sections at a throat plane, each diverging outward from the throat plane. Coolant channels formed in the wall of the nozzle are arranged in spirals around the nozzle axis. Preferably, the conical sections are formed from platelet laminates rolled into conical form with a single spiral seam, and at least one of the conical sections is a composite of two or more component conical sections separately formed and then joined in a nested arrangement with the seams not superimposed. A further preferred construction is one in which the convergent end of one conical section is split radially into strips that are then spread apart to serve as bonding surfaces to bond to the other conical section.

14 Claims, 8 Drawing Sheets

OTHER PUBLICATIONS

Elam, S.K. and Hayes, W.A. "Subscale hot–fire testing of a formed platelet liner," *AIAA 29th Joint Propulsion Conference and Exhibit* Jun. 28–30, 1993/Monterey, CA, pp. 1–9.

Fisher, S.C. "Liquid propulsion," *Aerospace America* Dec. 2001, pp. 64–65.

Moses, P.L. et al. "An airbreathing launch vehicle design with turbine–based low–speed propulsion and dual mode scramjet high–speed propulsion," *AIAA 9th International Space Planes and Hypersonic Systems and Technologies Conference and 3rd Weekly Ionized Gases Workshop* Nov. 1–5, 1999/Norfolk, VA, pp. 1–21.

Mueggenburg, H.H. et al. "Platelet actively cooled thermal management devices," *AIAA 28th Joint Propulsion Conference and Exhibit* Jul. 6–8, 1992/Nashville, TN, 22 pages total.

* cited by examiner

NOZZLE WITH SPIRAL INTERNAL COOLING CHANNELS

BACKGROUND OF THE INVENTION

1. Field of the Invention

This invention resides in the field of thrust nozzles for liquid-fuel rocket engines, and addresses in particular the means by which the nozzle is cooled.

2. Description of the Prior Art

The high pressure at which liquid-propellant rocket engines operate and the high temperature attendant to the high pressure make efficient and effective cooling of the thrust nozzle a necessity. One cooling method currently in use is the incorporation of coolant channels in the walls of the nozzle by forming the nozzle walls from platelet laminates with engineered channels formed by openings etched through the platelets. With supersonic nozzle geometries, however, The construction of nozzles with this type of channel is a complex process for supersonic nozzles, however, in view of the compound curvature that is typical of supersonic nozzles. The nozzle is generally formed in two or more lengthwise sections that are welded together along axially oriented seams. The seams are areas of potential material failure and discontinuity, particularly in the coolant channels. Further risks arise from the arrangement of the individual coolant channels, particularly those whose width is on the order of 0.05 cm. When localized hot gas (i.e., a portion of the gas that is at a higher temperature than the surrounding gas) occurs in the combustion chamber, a hot streak can form along the inner wall of the chamber as the gas flows axially through the chamber, and the streak can cause excessive heating of the coolant in the coolant channel closest to the streak. The temperature rise causes the coolant in that channel to expand, which lowers the density of the coolant and hence its cooling capacity, thereby compounding the hot streak and causing the temperature to rise even more, ultimately resulting in burnout of the channel and possibly total failure of the engine.

SUMMARY OF THE INVENTION

The limitations described above and others associated with rocket thrust engines that are cooled by multiple cooling channels are addressed by the present invention, which resides in a convergent-divergent rocket nozzle formed from two coaxially aligned conical sections that are joined at a throat plane with each section diverging outward from the plane, the wall of at least the upstream conical section containing coolant channels curving through the wall interior in spirals. The coolant flow paths established by these channels thereby traverse the axial direction of flow of the combustion gases inside the nozzle chamber. Any localized temperature excess (hot streak) in the gas stream in the combustion gas will therefore be cooled by a succession of coolant channels as the gas stream flows through the nozzle. Since heat exchange between the coolant and the hot streak will occur in only the small portion of each spiraling channel that traverses the hot streak, expansion of the coolant and reduction in coolant density is minimized.

The use of coaxially aligned conical sections as the convergent and divergent portions of the nozzle offers certain advantages in the design and construction of the nozzle. One of these advantages is the ability to form each portion of the nozzle from a single sheet or laminate of material and roll the sheet or laminate into a conical section by abutting the two opposing edges of the sheet or laminate along a single seam. The use of one seam rather than two or more reduces significantly the areas in which nozzle failure or cooling discontinuities can occur. The seam lowers the possibility of failure even more if the seam is spirally oriented rather than axial (i.e., longitudinal). When both the seam and the coolant channels are spirally oriented in the same direction, continuity of the coolant flow and ease of construction are both enhanced.

The closing of the sheet or laminate to form the conical section benefits further when the conical section consists of two or more nested conical section components each having been separately rolled into conical form prior to being combined with the other(s) in the nested arrangement. The nested components are arranged such that the seams of adjacent components are not superimposed. Thus, when the seams are spirally oriented, seams of adjacent component sections spiral either in opposite directions or in the same direction but out of phase. Once the individual components are stacked in the nested arrangement, the facing surfaces of the adjacent components are bonded together, thereby eliminating the need to bond the abutting edges of any single component section.

When nested conical component sections are used, each component can contain coolant channels that are independent of those of the adjacent component(s), thereby permitting the use of different coolant flow rates and heat transfer loads in each component. A higher coolant flow rate and heat transfer load is generally needed, for example, at locations immediately adjacent to the nozzle interior compared to locations closer to the nozzle exterior. The nested arrangement also facilitates the construction of complex coolant flow configurations such as coolant loops and transfers between the walls of the upstream and downstream conical sections.

Also disclosed herein is a novel method for joining the separately formed conical sections to form the convergent and divergent portions of the nozzle with a throat in between. According to this method, the convergent end of an individual conical section is split longitudinally into strips, the slits and strips beginning at the location where the throat will be formed. The strips are then spread outward at angles equal to the cone angle of the other conical section, and the two sections are combined by bonding the strips to the wall of the other conical section. Strips can be formed on both conical sections to join the sections even more strongly, the strips of the first conical section being bonded to the interior surface of the second conical section and the strips of the second conical section being bonded to the exterior surface of the first conical section, or vice versa.

The concept of splitting one end of a conical section into strips and the concept of using nested conical component sections can be applied jointly to a further advantage. Strips can be formed at the inlet end of the nozzle, i.e., the divergent end of the upstream conical section rather than the convergent end, the strips then turned first outward and then parallel to the nozzle axis to form the shell of an acoustic cavity. Nested components with similarly spaced strips are arranged with the strips of adjacent components overlapping, thereby closing the spaces between strips to form a continuous shell wall with no gaps.

Other features, advantages, and implementations of the concepts of this invention will be apparent from the description that follows.

DETAILED DESCRIPTION OF THE INVENTION AND PREFERRED EMBODIMENTS

Definitions

Figure 1:
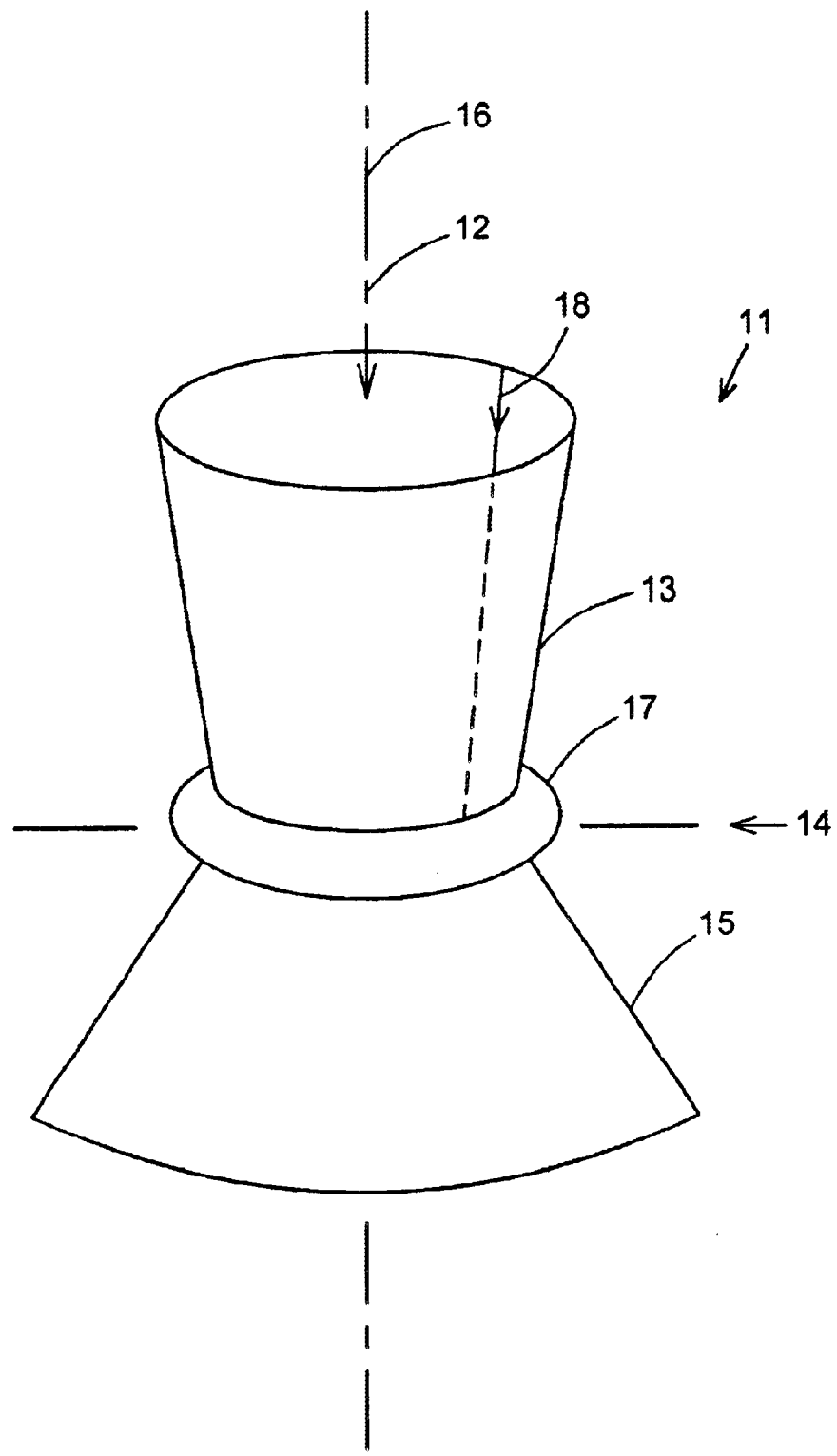
FIG. 1 is a perspective view of a nozzle in accordance with the present invention.

The terms appearing in this specification and the appended claims are used in accordance with their conventional meanings unless otherwise noted. The following explanations are offered to clarify the meaning intended herein for certain of these terms which might otherwise be ambiguous.

The terms "cone" and "conical form" denote a geometric shape defined by a moving straight line joining each point of a closed curve in a plane with a point that is not in the plane, the moving line defining the wall of the cone and the point serving as the apex of the cone. The term "circular cone" denotes a cone in which the closed curve is a circle. The term "cone axis" denotes the line defined by the apex of the cone and the center of the closed curve. The term "right circular cone" denotes a cone in which the cone axis is perpendicular to the plane of the closed curve.

The term "cone angle" denotes the angle between the axis of the cone and the wall of the cone.

The term "conical section" denotes a cone that is truncated by one or two planes intersecting the cone, preferably a plane that is perpendicular to the cone axis. The term thus includes cones terminated at one end by the apex of the cone and at the other end by an intersecting plane, as well as frustoconical sections defined by the portion of a cone extending between two parallel intersecting planes on the same side of the cone axis, thereby eliminating the cone axis.

The term "nested component conical sections" denotes two or more conical sections that are stacked, i.e., one placed inside another with the exterior surface of one section in full contact with the interior surface of an adjacent conical section. Nested component conical sections are first formed separately, then nested and preferably fused together after nesting by procedures such as brazing.

The term "convergent end" denotes the end of a conical section closest to the cone apex, and the term "divergent end" denotes the end of a conical section furthest from the cone axis.

The term "spiral" denotes a three-dimensional curve that curves about an axis, either in a partial turn or in one or more full turns, the axis in this invention being the cone axis and the curve following the wall of the cone with vector components in both the axial and circumferential directions.

Description

While this invention is capable of implementation in a variety of ways, a detailed understanding of the invention and its scope can be achieved by a study of certain specific embodiments. Such embodiments are shown in the drawings and described below.

FIG. 1 offers a perspective view of the exterior of a thrust nozzle 11 in accordance with the invention. The flow of combustion gases through the nozzle is in the axial direction indicated by the arrow 12, passing first through the nozzle chamber 13, then through the throat 14, and finally through the supersonic section or skirt 15. The chamber 13 and skirt 15 are each formed of conical sections, and specifically frustoconical sections of different lengths and cone angles. The two sections are axially aligned with a common cone axis 16, and are joined to form the throat 14 from which they diverge in opposite directions. The lengths, diameters, and cone angles of these conical sections will vary according to the desired thrust and other parameters and specifications of the rocket engine. As an illustration, one example of a nozzle in accordance with this invention has a chamber with a diameter at the inlet plane of 12 inches (30 cm), a height of 18 inches (46 cm), and a cone angle of 7°, and a skirt with a height of 12 inches (30 cm) and a cone angle of 32°. These dimensions result in a throat having a diameter of 7.5 inches (19 cm) and an expansion ratio (i.e., area ratio) of 7:1 from the throat to the exit plane at the downstream end of the skirt.

An inlet torus 17 encircles the throat to provide coolant to coolant channels within the walls of the conical sections through openings (not shown) in the torus and in the external walls of the conical sections. A hot streak 18 which is typical of those that cause engine failure in nozzles of the prior art is shown along the interior wall in the axial direction, i.e., along a line that is a projection of the cone axis on the internal wall of the nozzle.

Figure 2:
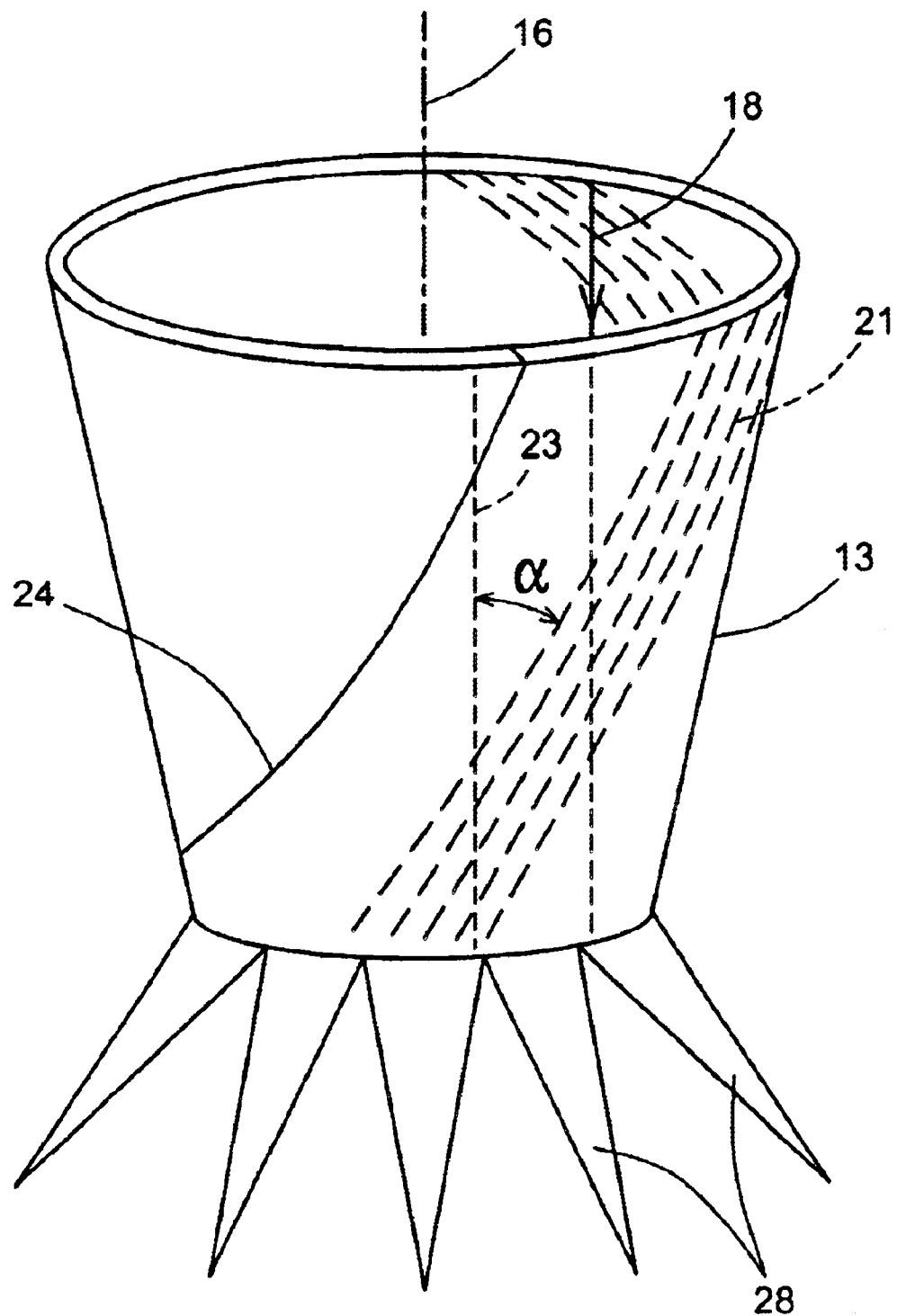
FIG. 2 is a perspective view of the chamber section of the nozzle of FIG. 1.

The chamber portion of the nozzle, i.e., the upper conical section 13, the cone axis 16 of the nozzle, and the path of the hot streak 18 along the interior surface of the wall of the chamber are also shown in FIG. 2. FIG. 2 further shows, in dashed lines, the spiral coolant channels 21 inside the wall 22. Although only a small number of channels is shown in the drawing for clarity, the total number of channels is sufficient to extend around the full circumference of the conical section. Because of the spiral orientation of the channels, the hot streak 18 traverses a multitude of channels rather than flowing alongside one or more channels for the entire length of the chamber. In this way, the compounding effect of the hot streak on the coolant in the axially directed channels of the prior art is avoided.

The angle of the channels in this invention is not critical and may vary. For convenience, the angle a can be measured relative to a projection 23 of the cone axis 16 on the nozzle wall. In preferred embodiments of the invention, this angle is from about 15° to about 40°, and in particularly preferred nozzles in accordance with this invention, this angle is from about 25° to about 35°. A currently preferred angle is 30°.

The size and spacing of the channels is also variable, and will be selected on the basis of the cooling needs of the nozzle as governed by its dimensions and operating conditions. In most cases, best results will be obtained with channels having a cross-sectional area of from about 0.001 square inch to about 0.03 square inch (about 0.0065 $cm^2$ to about 0.19 $cm^2$). A presently preferred channel size is 20 mils by 40 mils (0.020 inch by 0.040 inch, or 0.051 cm by 0.102 cm), although channel sizes up to twice these dimensions are contemplated as well. The spacing between channels is preferably approximately equal to the width of a single channel.

Also shown in FIG. 2 is the seam 24 or closure line of the conical section. The seam in this embodiment is spirally oriented in the same manner as the coolant channels, and for ease of construction, the angle of the seam is the same as that of the coolant channels.

Figure 3:
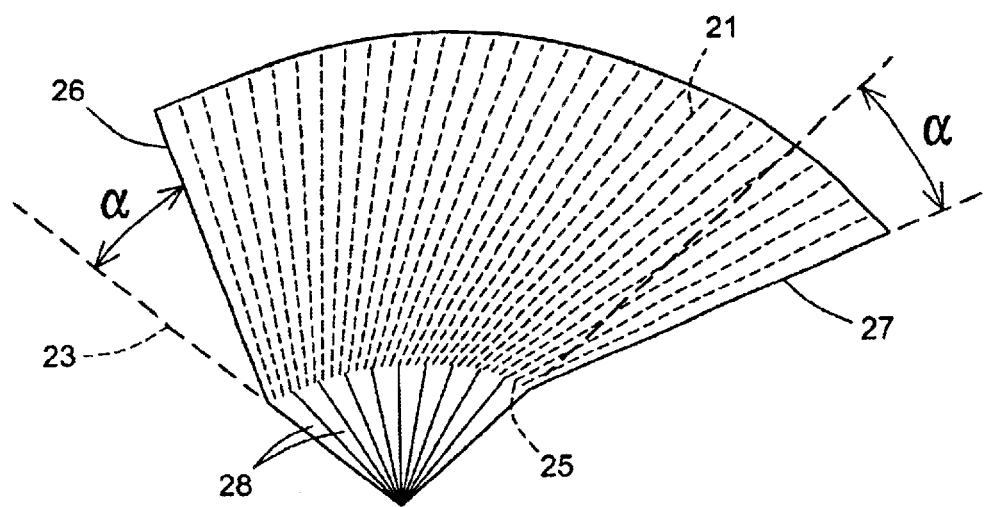
FIG. 3 is a plan view of a laminate from which the chamber section of FIG. 2 is formed.

The conical section 13 is formed from a unitary sheet or laminate, shown in FIG. 3 in flat form prior to being rolled into the conical form in which it appears in FIG. 2. The flat piece is generally fan-shaped, but with a discontinuity at an arc 25 that will form the throat of the nozzle. The discontinuity is due to the non-radial angle of the edges 26, 27 of the piece on the outer side of the arc 25 since these edges will be abutted to form the seam 24 of FIG. 2 and are therefore at the same angle a relative to the radius 23 as the seam and the coolant channels.

Figure 4:
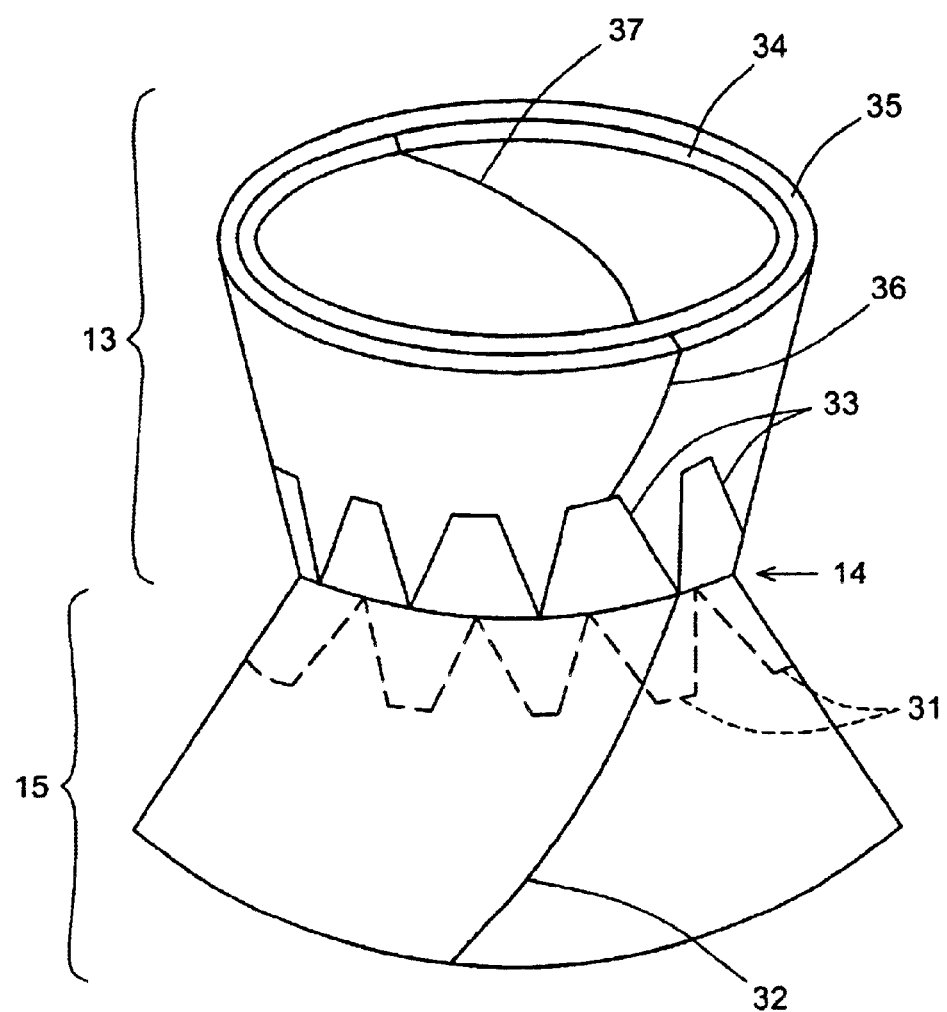
FIG. 4 is a perspective view of a second nozzle in accordance with the present invention, similar to the nozzle of FIG. 1.

At its convergent end on the concave side of the throat arc 25 (FIG. 3), the unitary sheet or laminate from which the conical section is formed is split along radial lines into strips 28 which will be spread apart as shown in FIG. 2 to form tapered extensions distributed around the full circumference of the throat. These extensions will be bonded to the interior surface of the lower conical section 15 (FIG. 1) as a means of joining the two conical sections together. The extensions can terminate in points as shown in FIGS. 2 and 3 or they can be truncated as shown in FIG. 4. The number of strips or extensions may vary, although best results will be achieved when at least six strips are present, and preferably from eight to twelve.

FIG. 4 shows the two conical sections joined with the truncated extensions 31 of the upper conical section 13 bonded to the inside of the lower conical section 15 and therefore shown in dashed lines. The lower conical section 15 is constructed in the same manner as the upper conical section 13, with spiral-oriented internal coolant channels (not shown), a single spiral seam 32, and radial split lines on the opposite side of the throat plane 14 to form extensions 33 that are spread apart and bonded to the exterior surface of the upper conical section 13. The two sets of extensions together provide a highly secure connection between the two conical sections, and although both are shown in truncated form in FIG. 4, either or both can extend to points as shown in FIG. 2. Furthermore, while FIG. 4 shows the extensions of the upper conical section on the inside of the structure and those of the lower conical section on the outside, the arrangement can be reversed, with the extensions of the upper conical section on the outside and those of the lower conical section on the inside.

Although not shown in the Figures, an alternative to the splitting of the tapering end of the conical section(s) along radial lines is to truncate the section and form a stub or short expanded portion downstream of the throat. Such a feature can be formed by conventional metal forming methods. The stub can then be used as a bonding surface to join the two conical sections together.

FIG. 4 further shows the upper conical section 13 as a combination of component conical sections 34, 35 in a nested arrangement. As noted above, this is a preferred embodiment of the invention that promotes ease of manufacture of the conical section and of the coolant channels inside the section wall and readily allows the channels to be formed in layers. This is useful for example when different coolant flow rates are desired at different depths of the wall. The nested arrangement also facilitates the closure of the individual component conical sections by adjacent components together along their opposing surfaces rather than bonding an individual component to itself along the seam of that component, or by bonding both between adjacent components and at the seams of individual components.

Each component conical section 34, 35 of the nested arrangement is formed by rolling a flat sheet or laminate such as that shown in FIG. 3, and each has a single spiral seam. The two components are arranged such that the spiral seam 36 of the outer component and the spiral seam 37 of the inner component are not superimposed. In the arrangement shown, the two seams spiral in the same direction and are directly opposite one another across the chamber, although the spacing between them is not critical. Alternatively, the seams can spiral in opposite directions, even crossing each other, although preferably not crossing. Preferably, the seams are arranged as shown, both spiralling in the same direction and well removed from each other. When three or more components are present, each will preferably have a spiral seam and the spiral seams of adjacent components will preferably turn in the same direction without being superimposed or crossing each other.

Figure 5:
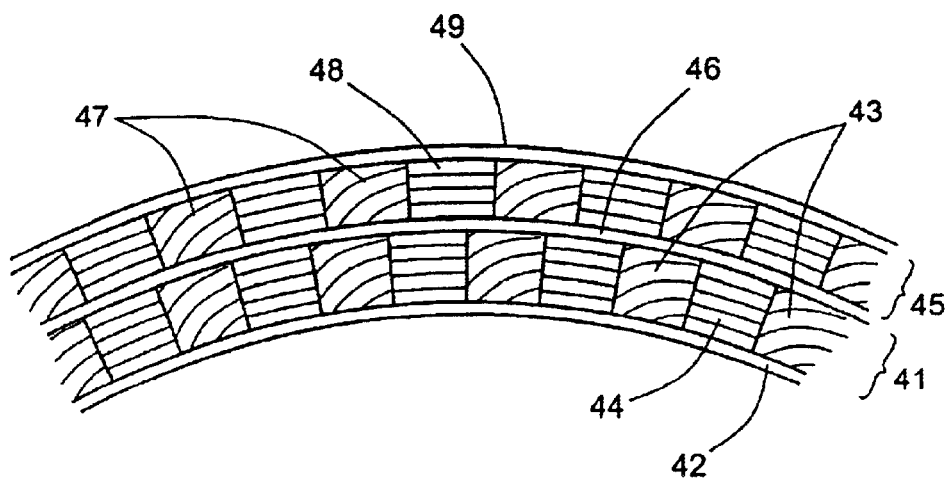
FIG. 5 is a cross section of a portion of the wall of the chamber section of the nozzle of FIG. 1.

FIG. 5 is a cross section of one example of a conical section consisting of nested component conical sections. In this example, three component conical sections are included and the section wall contains two sets of channels. The inner component 41 consists of a laminated platelet stack whose innermost platelet 42 serves as the inner wall of the conical section and the inner wall of a first or inner set of channels 43, and whose remaining platelets 44 form the side walls of the inner channels. The middle or intermediate component conical section 45 consists of another laminated platelet stack whose innermost platelet 46 serves as the outer wall of the first or inner set of channels 43 and the inner wall of the second or outer channels. The third component conical section consists of a single platelet or jacket 49 that serves as the outer wall of the second or outer set of channels. While the Figure shows three component conical sections, the number can be two or four or more, depending on the particular channel arrangement and the number and configuration of platelets in each section.

While platelet technology is well known, the following explanation is offered to facilitate an understanding of the use of platelets and platelet stacks in this invention. Masks are first applied to individual metallic layers (platelets), either by stencils or by photographic techniques. The platelets are then chemically etched through the masks, and the masks are then removed. The platelets are then laminated together by either diffusion-bonding, roll-bonding, brazing, or other conventional lamination techniques. Diffusion-bonding involves hot pressing at pressures typically in the range of 6.9 to 20.7 MPa (1000 to 3000 psi) and temperatures typically in the range of 455° C. to 540° C. The individual platelets themselves may be made of any material that can be formed into appropriately thin sheets and that can be etched and diffusion-bonded, and that can withstand the conditions under which the finished nozzle will be operated. Examples of metallic materials that meet this description are copper, copper alloys, nickel alloys, aluminum, titanium, and various stainless steels. Platelets having thicknesses of less than about 0.025 inch (0.064 cm), or within the range of from about 0.001 inch (0.0254 cm) to about 0.025 inch (0.064 cm), per platelet are preferred. The number of platelets in a single laminate will vary with the needs of the nozzle and may range from three to 30.

Individual component conical sections are preferably formed by laminating a platelet stack in a flat configuration, then rolling the laminated stack into conical form. Once in conical form, two or more individual sections are nested and bonded together by brazing or other metallurgical techniques that will form a secure and gap-free bond between the components. The use of nested component sections lessens the risk that rolling of the laminate will cause platelet shear or channel distortion, particularly when the outer platelets of the inner laminate are through-etched platelets as they are in the inner component 41 and the intermediate component 45 shown in FIG. 5. As these laminates are rolled, these outer platelets will spread without shear or collapse of the channel openings, and closure or completion of the channels is achieved after rolling by nesting of the components and bonding the nested components together.

Figure 6:
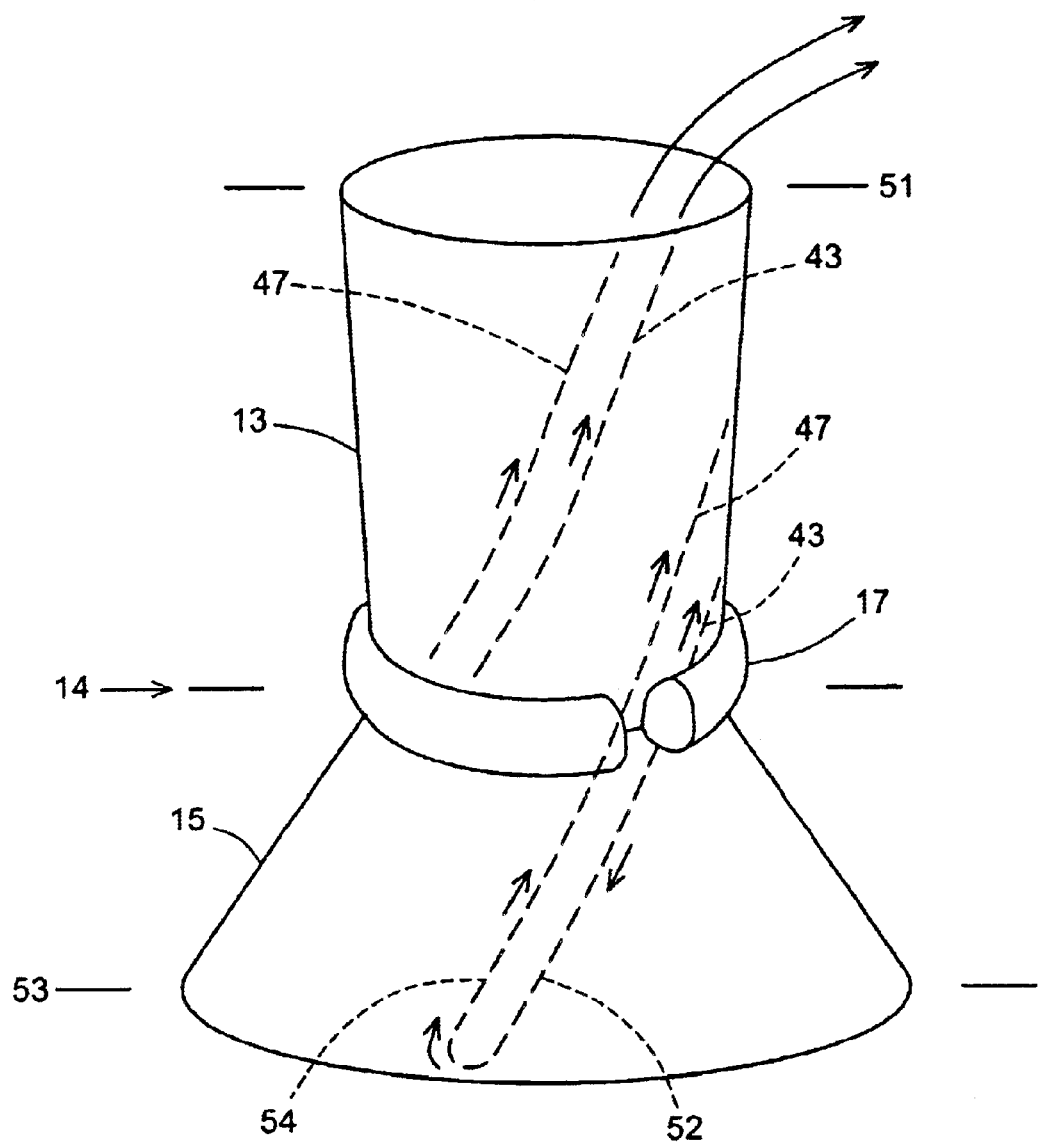
FIG. 6 is a further perspective view of the nozzle of FIG. 1.

One method of utilizing different sets of coolant channels in different layers of the nozzle walls is demonstrated in FIG. 6, which depicts the upper cylindrical section 13, the lower cylindrical section 15, and the inlet torus 17 at the throat plane. The inlet torus 17 is shown with a section broken away to show representative flow paths of coolant leaving the torus. Fluid communication between the interior of the torus and the spiral cooling channels in the nozzle walls is achieved by ports along the wall of the torus facing the nozzle and openings in the nozzle wall, formed by through-etching of the outermost platelets or jacket (the ports and openings are not visible in the drawing). The ports and channels in this example are arranged to form two independent flow paths. One flow path leads from the torus 17 to the upper conical section 13 and travels through channels 43 of the inner layer (as also seen in the cross section view of FIG. 5) of that section toward the inlet plane 51 where the coolant leaves the nozzle wall. The second flow path leads from the torus 17 to the lower (downstream) conical section 15 and travels through channels 52 in that section toward the nozzle outlet plane 53. Instead of leaving the nozzle at the outlet plane, however, the second flow path turns to travel back up the cylindrical section through return channels 54. At the throat plane 14, the return channels are connected to channels 47 of the outer layer of the upper conical section (these channels 47 are also seen in the cross section view of FIG. 5). The coolant flows through the outer layer channels 47 to the inlet plane 51, where the coolant leaves the nozzle wall. The inner and outer layer channels are shown side by side in the drawing to enhance visibility, but are superimposed as shown in FIG. 5. With this arrangement, the coolant can be distributed between the two flow paths in unequal amounts. This allows a larger coolant flow rate to be used in the coolant channels 43 that are closer to the nozzle interior as well as a larger total coolant flow rate through the upper conical section than through the lower conical section. Many other arrangements can be devised, as will be readily apparent to those skilled in the art.

Figure 7:
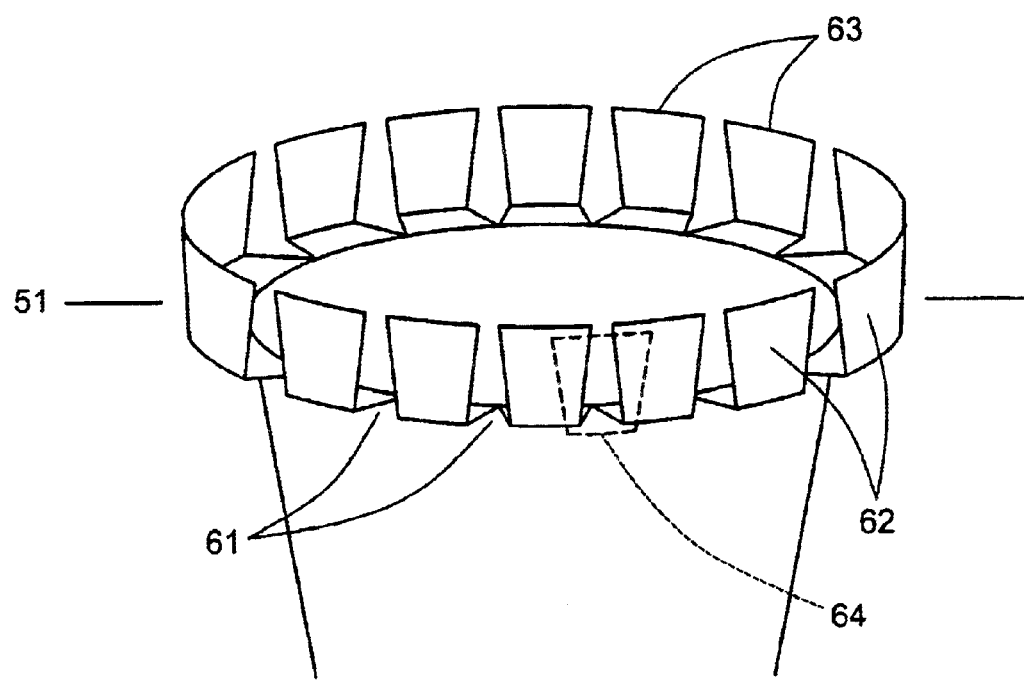
FIG. 7 is a perspective view of the inlet plane of a nozzle in accordance with the present invention.
Figure 8:
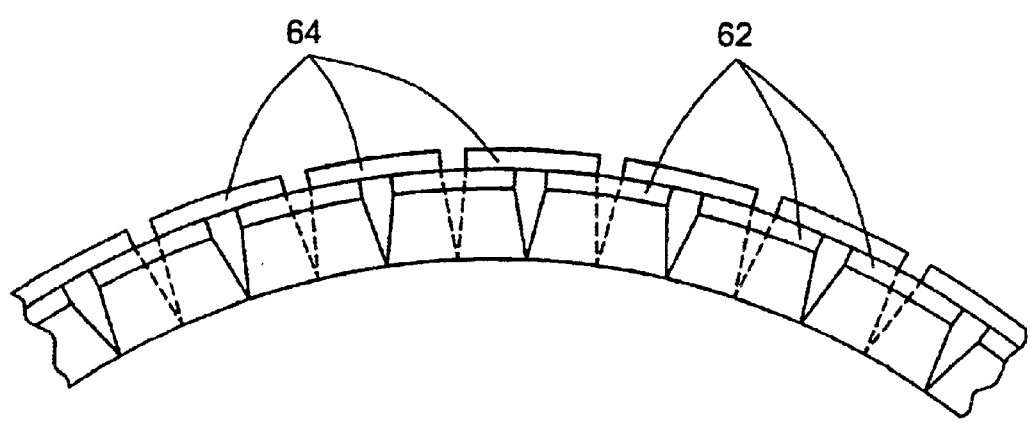
FIG. 8 is a top view of the inlet plane of FIG. 7.

While the convergent ends of the conical sections can be divided into strips as described above, the divergent ends can be divided or split into strips as well, for other purposes. One such purpose is illustrated in FIGS. 7 and 8, which depict the divergent end of the upper conical section, at the inlet plane 51 of the nozzle. The slits 61 separating the strips are radial, as they are at the convergent end, but rather than taper, the resulting strips 62 expand in width toward their ends 63 due to the divergence at this end of the conical section. The strips in this example are used to form an expanded area at the inlet plane, with a diameter greater than the diameter of the conical section at that plane. To achieve this, each strip is bent outward from the cone axis and then back to a direction approximately parallel to the cone axis, thereby forming the base and side wall of a shoulder at the inlet plane.

To close the gaps in the side wall of the shoulder due to the slits 61, the conical section can be combined with a second conical section in a nested arrangement like the nested arrangements described above. The second conical section is split at its divergent end into strips in the same manner as the first conical section, and the strips are bent in the same manner to form an expanded area that extends outward by a distance slightly greater than that of the first conical section to permit the strips of the first conical section to fit inside those of the second. The second or outer conical section is rotated slightly relative to the first or inner conical section so that the strips of the two sections are staggered. The strips of the outer conical section, represented by a single strip 64 shown in dashed lines in FIG. 7, thereby cover the slits of the 61 of the inner conical section. Another view of the staggered strips 61, 64 is presented by the top view of FIG. 8. These staggered strips form the floor and side wall of an acoustic chamber which can be completed by an appropriately constructed inlet injector manifold (not shown) secured over the (upstream) injector inlet plane.

The foregoing description focuses on particular embodiments of the invention for purposes of explanation and illustration. Further embodiments and modifications of the above will be apparent to those skilled in the art upon reviewing this description, such embodiments and modifications falling within the scope of the invention as defined by the appended claims.

What is claimed is:

1. A convergent-divergent rocket nozzle comprising first and second conical sections coaxially aligned and joined at a throat plane with each of said conical sections diverging from said throat plane, said first conical section defining a longitudinal cone axis and comprising a wall with a plurality of internal coolant channels arranged in spirals around said cone axis, and said first conical section comprising a laminate of platelets formed from a laminate sheet closed into conical form along a single seam arranged in a spiral around said axis.

2. A rocket nozzle in accordance with claim 1 in which said spiral coolant channels form an angle of from about 15° to about 40° relative to a projection of said cone axis on said wall.

3. A rocket nozzle in accordance with claim 1 in which said coolant channels each form an angle of from about 25° to about 35° relative to a projection of said cone axis on said wall.

4. A rocket nozzle in accordance with claim 1 in which said first conical section is comprised of an inner laminate of platelets formed from a first sheet closed into conical form along a single seam and an outer laminate of platelets formed from a second sheet closed into conical form along a single seam, both seams arranged in spirals around said axis, the seam of said outer laminate not superimposed over the seam of said inner laminate, the platelets of said inner laminate forming inner and side walls of said coolant channels and said outer laminate forming outer walls of said coolant channels.

5. A rocket nozzle in accordance with claim 1 in which said internal coolant channels are comprised of inner and outer coolant channels, and said first conical section is comprised of:

(i) an inner laminate of platelets formed from a first sheet closed into conical form along a single spiral seam and forming inner and side walls of said inner coolant channels, (ii) an intermediate laminate of platelets formed from a second sheet closed into conical form along a single spiral seam that is not superimposed over said seam of said inner laminate, said intermediate laminate forming outer walls of said inner coolant channels and inner and side walls of said outer coolant channels, and (iii) an enclosure forming outer walls of said outer coolant channels.

6. A rocket nozzle in accordance with claim 5 in which said second conical section defines a longitudinal cone axis that is coaxial with the cone axis of said first conical section, and said second conical section comprises a wall with a plurality of internal coolant channels arranged in spirals around said cone axis of said second conical section.

7. A rocket nozzle in accordance with claim 6 in which said first and second conical sections have divergent ends opposite said throat plane and said internal coolant channels of said first and second conical sections collectively define two sets of coolant flow passages, said rocket nozzle further comprising means for introducing coolant to said internal coolant channels at said throat plane, the first set comprising passages extending from said throat plane through said inner coolant channels of said first conical section to exit ports at said divergent end of said first conical section, and the second set comprising passages extending from said throat plane through said internal coolant channels of said second conical section, returning to said throat plane, then passing through said outer coolant channels of said first conical section to exit ports at said divergent end of said first conical section.

8. A rocket nozzle in accordance with claim 1 in which said second conical section defines a longitudinal cone axis that is coaxial with the cone axis of said first conical section, and said second conical section comprises a wall with a plurality of internal coolant channels arranged in spirals around said cone axis of said second conical section.

9. A convergent-divergent rocket nozzle comprising first and second conical sections coaxially aligned and joined at a throat plane with each of said conical sections diverging from said throat plane, said first conical section defining a longitudinal cone axis and comprising a wall with a plurality of internal coolant channels arranged in spirals around said cone axis, said first and second conical sections each having convergent ends and divergent ends and each having a cone angle; at least one of said first and second conical sections terminating at its convergent end in a segment that is split longitudinally into at least six strips that are spread apart at angles equal to the cone angle of the other of said first and second conical sections; said strips bonded to said other conical section.

10. A rocket nozzle in accordance with claim 9 in which said strips are at least eight in number.

11. A rocket nozzle in accordance with claim 9 in which said strips are at eight to twelve in number.

12. A convergent-divergent rocket nozzle comprising first and second conical sections coaxially aligned and joined at a throat plane with each of said conical sections diverging from said throat plane, said first conical section defining a longitudinal cone axis and comprising a wall with a plurality of internal coolant channels arranged in spirals around said cone axis, said first and second conical sections each having convergent ends and divergent ends and a cone angle;

said first conical section terminating at its convergent end in a segment that is split longitudinally into at least six strips that are spread apart at angles equal to the cone angle of the said second conical section and are bonded to said second conical section; and said second conical section terminating at its convergent end in a segment that is split longitudinally into at least six strips that are spread apart at angles equal to the cone angle of the said first conical section and are bonded to said first conical section.

13. A convergent-divergent rocket nozzle comprising first and second conical sections coaxially aligned and joined at a throat plane with each of said conical sections diverging from said throat plane, said first conical section defining a longitudinal cone axis and comprising a wall with a plurality of internal coolant channels arranged in spirals around said cone axis, said first conical section having a divergent end opposite said throat plane, and said first conical section terminating at said divergent end in a segment that is split longitudinally into a plurality of strips that are bent outward to form an expanded rim.

14. A rocket nozzle in accordance with claim 13 in which said first conical section is an aggregate conical section comprised of at least two nested component conical sections, each component conical section terminating at its divergent end in a segment that is split longitudinally into a plurality of strips bent outward, with strips of adjacent component conical sections staggered to form a continuous wall of an acoustic cavity.

* * * * *